(12) United States Patent
Schmidt et al.

(10) Patent No.: US 7,632,183 B2
(45) Date of Patent: Dec. 15, 2009

(54) COLLECTING TROUGH CONSTRUCTION EASILY ACCESSIBLE FOR CLEANING

(75) Inventors: James R. Schmidt, Andale, KS (US); Jonathan E. Ricketts, Ephrata, PA (US); Robert A. Matousek, Milan, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/072,182

(22) Filed: Feb. 25, 2008

(65) Prior Publication Data

US 2009/0215510 A1    Aug. 27, 2009

(51) Int. Cl.
*A01B 71/08* (2006.01)
(52) U.S. Cl. .................................. 460/104
(58) Field of Classification Search ............. 460/104, 460/108, 109, 69, 72, 119, 101, 93, 85, 78; 56/14.6; 209/241, 243, 247, 257, 394
See application file for complete search history.

(56) References Cited

U.S. PATENT DOCUMENTS

| | | | | |
|---|---|---|---|---|
| 2,616,433 A | * | 11/1952 | Anderson | 460/109 |
| 2,743,728 A | | 5/1956 | Carlson | 130/27 |
| 3,209,898 A | | 10/1965 | Beebe et al. | 198/205 |
| 3,470,881 A | | 10/1969 | Knapp et al. | 130/27 |
| 3,537,460 A | | 11/1970 | Van Buskirk | 130/27 |
| 3,568,682 A | * | 3/1971 | Knapp et al. | 460/108 |
| 3,635,329 A | | 1/1972 | Walters | 198/213 |
| 3,871,384 A | | 3/1975 | Depauw et al. | 130/27 |
| 3,913,589 A | * | 10/1975 | Rouse et al. | 460/90 |
| 3,957,058 A | | 5/1976 | Komancheck | 130/27 |
| 4,090,604 A | | 5/1978 | Reifert | 198/861 |
| 4,128,160 A | | 12/1978 | Deal et al. | 198/657 |
| 4,352,426 A | | 10/1982 | Peterson, Jr. | 198/657 |
| 4,375,221 A | * | 3/1983 | Bernhardt et al. | 460/109 |
| 4,442,847 A | | 4/1984 | Buck | 130/27 |
| 4,461,306 A | * | 7/1984 | De Busscher | 460/104 |
| 4,466,447 A | * | 8/1984 | Hoefer et al. | 460/13 |
| 4,712,568 A | * | 12/1987 | Strong et al. | 460/69 |
| 4,863,415 A | * | 9/1989 | Carnewal et al. | 460/101 |
| 4,884,994 A | | 12/1989 | Hall et al. | 460/66 |

(Continued)

*Primary Examiner*—Árpád Fábián-Kovács
(74) *Attorney, Agent, or Firm*—Michael G. Harms; John Williams Stader; Patrick M. Sheldrake

(57) ABSTRACT

A collecting trough construction for facilitating the clean out of collecting troughs of clean grain and tailings collecting and conveying systems of agricultural combines, such collecting trough construction including a base pan sized and dimensioned to extend longitudinally between first and second cross-pieces of such a collecting and conveying system, one of which cross-pieces may be a clean grain auger trough or a tailings auger trough, and laterally generally between the sidesheets of a combine, with collecting troughs formed in the upper side thereof, which base pan has first and second ends and is positionable between the first and second cross-pieces with the first end of the auger trough base pan adjacent the first cross-piece and the second end of the auger trough base pan adjacent the second cross-piece to be readily complementarily engageable therewith and wholly or partially disengageable therefrom by a user to permit convenient access to the formed collecting troughs for cleaning thereof. Preferably, the base pan is, alternatively, partially detachable to permit access for cleaning by a user in an in-place clean-out position or wholly removable to permit the removal of such base pan to a remote location for cleaning by the user thereat.

21 Claims, 9 Drawing Sheets

U.S. PATENT DOCUMENTS

| | | |
|---|---|---|
| 5,334,093 A | 8/1994 | Jensen et al. .................. 460/83 |
| 5,919,087 A * | 7/1999 | Strong et al. .................. 460/72 |
| 6,485,364 B1 | 11/2002 | Gryspeerdt et al. ......... 460/107 |
| 6,672,957 B2 * | 1/2004 | Voss et al. .................. 460/101 |
| 7,297,051 B1 * | 11/2007 | Schmidt et al. ............... 460/93 |
| 2003/0216159 A1 * | 11/2003 | Van Der Haegen et al. . 460/107 |

\* cited by examiner

COLLECTING TROUGH CONSTRUCTION EASILY ACCESSIBLE FOR CLEANING

TECHNICAL FIELD

This invention relates generally to material collecting and conveying systems of agricultural combines and to a construction for facilitating the clean out of the collecting troughs of such systems, and, more particularly, to a collecting trough base pan for such systems that has collecting troughs formed on the upper side thereof and which can be easily and quickly installed for use during harvesting operations and conveniently accessed or removed at different times for cleaning. Preferably, the base pan will be partially detachable or disengageable to permit the collecting troughs to be made accessible generally in-place for cleaning and also removable to permit remote cleaning of the collecting troughs of the base pan.

BACKGROUND ART

In the harvesting of crops it is desired that the grain be separated from other elements or portions of the crop, such as from pod or cob fragments, straw, stalks, and the like. Agricultural combines typically have employed a rotary threshing or separating system for separating and segregating the grain from such other crop elements or portions. Typical of such rotary threshing or separating systems are constructions such as those described and depicted in Van Buskirk U.S. Pat. No. 3,537,460, issued to International Harvester Company, and Hall et al. U.S. Pat. No. 4,884,994, issued to Deere and Company. In general, rotary threshing or separating systems are so designed that, as threshing occurs, the resulting crop material is typically caused to fall directly onto an underlying vibratory cleaning system or onto one or more conveyors for conveyance to a cleaning system for further processing.

The cleaning system typically includes a set of stacked sieves or shoes that are reciprocally moved, usually in the fore and aft directions, to separate or sift the grain from tailings and material other than grain (MOG). With many combines, as the grain is cleaned from the MOG, it falls through the sieves and drops onto or into one or more underlying clean grain pans that are disposed below the sieves, which pans typically include a plurality of elongated and longitudinally oriented clean grain collecting troughs positioned side-by-side across at least a portion of the width of the combine to receive the clean grain that falls through the set of sieves. Such collecting troughs are configured to receive the grain falling therein and to convey such grain therethrough towards an intersecting, cross, generally laterally extending, clean grain conveyance trough, sometimes referred to as the clean grain auger trough. The laterally extending clean grain conveyance trough receives the clean grain conveyed thereto from the clean grain collecting troughs and typically has associated therewith a conveyance mechanism, often in the form of an auger extending therethrough, for moving and delivering the clean grain in such clean grain conveyance trough to an elevator that carries the clean grain up to a clean grain tank.

During the vibration of the sieves, air is typically blown upwardly and rearwardly through the sieves to carry lighter elements of the MOG, or chaff, away. The heavier elements and tailings that are too large to fall through the sieves and too heavy to be blown away are caused to be moved by the vibrations, generally rearwardly along the top surfaces of the sieves, towards and over rear edges of the sieves to fall onto a tailings pan located below and extending somewhat beyond such rear edges. The tailings pan, similarly to the clean grain pan, typically includes a plurality of elongated and longitudinally oriented tailings collecting troughs positioned side-by-side across at least a portion of the width of the combine to receive the tailings that fall thereinto from the rear edges of the sieves. Such collecting troughs are configured to receive the tailings therein and to convey such tailings therethrough towards an intersecting, cross, generally laterally extending, tailings conveyance trough, sometimes referred to as the tailings auger trough. The sidewardly extending tailings conveyance trough receives the tailings conveyed thereto from the tailings collecting troughs and has a conveyance mechanism, often in the form of an auger extending therethrough, for moving and delivering the tailings to a tailings return conveyor operable for carrying the tailings upwardly, back to the cleaning or separating system of the combine, for reprocessing.

For convenience of reference, the clean grain conveyance trough will generally hereinafter be referred to as the clean grain auger trough regardless of the particular conveyance mechanism that may be employed therewith for moving the clean grain through such trough, and the tailings conveyance trough will generally hereinafter be referred to as the tailings auger trough regardless of the particular conveyance mechanism that may be employed therewith for moving the tailings through such trough. It should be recognized and understood, however, that such appellations are not intended to indicate or require that an auger must necessarily be employed therein or associated with such trough.

Additionally, also for convenience of reference, the various collecting troughs through which the grain and other crop materials may be conveyed, whether disposed preceding or subsequent to the cleaning system, are hereinafter sometimes or often referred to as collecting auger troughs regardless of the particular conveyance mechanisms that may be employed therewith for moving the clean grain through such troughs. It should be recognized and understood, however, that such appellation is not intended to indicate or require that an auger must necessarily be employed in or associated with such troughs and that other types or forms of conveying mechanism could be utilized or employed to move or convey the materials through such collecting auger troughs. Typically, though, the conveying mechanisms employed with the grain collecting and conveying systems, whether disposed before or after the cleaning systems, have often taken the form of relatively small diameter augers, disposed side-by-side across a portion of the width of the combine to form an auger bed, with the augers extending through respective collecting troughs, for conveying grain and crop materials that fall into the collecting troughs through such collecting troughs towards other locations. Consequently, while, in the further presentations herein, reference will often be made to augers as the preferred form of conveying mechanisms and to the auger beds formed by such augers, one should bear in mind that other types or forms of conveying mechanisms might also be advantageously employed.

Although the augers associated with the collecting auger troughs are generally effective in conveying the grain and crop materials through the collecting auger troughs and for emptying the grain and crop materials from such auger troughs, portions of such materials, as well as dirt and other residue, hereinafter generally referred to as remnants, can build up over time along the bottoms and edges of the collecting auger troughs and at locations beyond the reach of the augers that extend through such collecting auger troughs, due in part to the necessity for maintaining clearances between the auger flights and the trough surfaces. The remnants may be loose elements or particles that remain in the collecting auger troughs or may be caked or encrusted material build-up that accumulates on surfaces or in nooks or crannies along the collecting auger troughs. Such build-up of remnants may become particularly noticeable when moisture is introduced into such collecting auger troughs and/or remnants remain in the troughs as they are exposed to weather extremes. It is desirable to be able to remove as much of such remnants, both loose and encrusted, as possible, as a consequence of which users periodically may have to take appropriate actions to remove or clean the remnants from the collecting auger troughs.

Cleaning of the collecting troughs has been, at best, inconvenient, even for the removal of loose elements or particles, and the actions required to effect such cleaning have been cumbersome and time consuming, often requiring the use of special physical means to effect the clean out of the crop remnants from the collecting troughs of such conveying systems. Clean out of encrusted remnant build-up has been even more difficult, often requiring extensive disassembly of at least portions of the conveying systems to procure access to the collecting auger troughs. When there is a frequent desire or need to clean out the collecting troughs, such as might arise in seeding operations, the associated inconvenience is exacerbated, and lost time increases significantly.

The clean-out problem is further magnified when access to the collecting troughs is more restricted or cumbersome, such as is often the case with many combines wherein the auger bed and the associated collecting troughs are disposed below or beneath other significant structural members, such as the stacked sieves of the cleaning system, and are fixedly installed in place and, consequently, are not readily accessible or removable.

Clean out of collecting troughs has therefore remained a problem and a significant inconvenience, especially when extensive disassembly efforts, which must often be performed in cramped and awkward positions from beneath the combine, are required in order to gain access to the collecting troughs. Combine users have continued to consider the time and effort required to effect an acceptable clean out of such collecting troughs to be unacceptably high.

SUMMARY OF THE INVENTION

What is now disclosed is a construction for facilitating the clean out of the collecting auger troughs of agricultural combines that overcomes or obviates many of the prior difficulties. Such construction employs an easily installable and readily detachable or disengageable elongated auger trough base pan that is positionable at a location to receive material falling thereonto and which is sized and dimensioned to extend longitudinally between first and second cross-pieces and laterally generally between the sidesheets of a combine. Such auger trough base pan, which has first and second ends and is positionable between the first and second cross-pieces with the first end of the auger trough base pan adjacent the first cross-piece and the second end of the auger trough base pan adjacent the second cross-piece, includes upper and lower sides with a plurality of troughs formed side-by-side on the upper side extending between the first and second ends and configured to permit augers to fit and operate in the formed troughs to convey material from one end of such formed troughs towards the other end of such formed troughs. Such auger trough base pan, sometimes hereinafter referred to more simply as the base pan, is further configured to be securably installable extending between the first and second cross-pieces during harvesting operations yet, at other times, to be partially or wholly disengageable from such cross-pieces to permit convenient access for clean out purposes to the formed troughs on the upper side of the auger trough base pan.

Preferably, the first and second ends of the auger trough base pan are configured to be complementarily engageable with the first and second cross-pieces to securably maintain such auger trough base pan in position therebetween during harvesting operations, with at least the second end being detachable or disengageable from the second cross-piece by the user at other times to permit the auger trough base pan to be generally accessibly tilted downwardly from the first end towards the second end thereof while the first end of the auger trough base pan remains at least loosely still engaged with the first cross-piece. Such configuration is preferably achieved such as by rotating the second end of the auger trough base pan downwardly about the at least still loosely engaged first end of the auger trough base pan, the effect of which is to incline the auger trough base pan downwardly from said first end towards its second end to permit cleaning of the auger trough base pan while the pan is in such an in-place position. Clean out of loose elements or particles remaining in the collecting auger troughs may often be able to be satisfactorily effected while the auger trough base pan is in such in-place clean-out position, and even some encrusted build-up may be able to be removed.

However, because, even when the auger trough base pan is in such an in-place clean-out position, the working environment around such auger trough base pan remains somewhat cramped and confined, it is further desirable that the auger trough base pan also be able to be readily totally removable to permit cleaning of the collecting auger troughs thereof to be performed at a more convenient location. Such removal is especially fortuitous when the remnant build-up in the collecting troughs is extensive or severe or when the cleaning activities would involve or require greater or more extended efforts by a user. Consequently, preferably, the first end of the auger trough base pan is also detachable or disengageable from the first cross-piece by the user so as to permit the auger trough base pan to be totally detached from both the first and second cross-pieces so that it can be removed to a remote location for maintenance and cleaning.

Interengagement members or assemblies of many various constructions and configurations can be readily utilized to effect complementary engagements between the auger trough base pan and the first and second cross-pieces, and such interengagement members or assemblies may also form part of, include, or be associated with, locking or securing members or assemblies that effectively secure the auger trough base pan in a relatively stable and uniform position during harvesting operations. For ease of further reference herein, all such members and assemblies are considered to be, and are hereinafter generically referred to as, connection members or connection assemblies, with those components or features of such connection members or connection assemblies that are associated with the first end of the auger trough base pan and the first cross-piece being considered a first end connection pairing and those components or features of such connection members or connection assemblies that are associated with the second end of the auger trough base pan and the second cross-piece being considered a second end connection pairing.

In the practice of the invention, at least one of the cross-pieces with which the auger trough base pan may be engaged may be the clean grain auger trough or the tailings auger trough of the collecting and conveying system of the combine. In such circumstances, the clean grain or tailings auger trough and the end of the auger trough base pan engaged therewith are preferably configured to be so matably engaged with one another that material in the collecting troughs may be easily conveyed from such collecting troughs into the clean grain or tailings auger trough, as may be appropriate, without introducing any obstructions to the passageways through the clean grain or tailings auger troughs that would hinder the conveyance of material therethrough. By way of example, the second end of the auger trough base pan and a side of the clean grain auger trough may employ interengageable lips thereon for mating the second end of the auger trough base pan to the clean grain auger trough, which second end connection pairing embodiment preserves and maintains a relatively smooth and uniform passageway through the clean grain auger trough when the second end of the auger trough base pan is mated to a side of the cross-wise extending clean grain auger trough.

While, as noted hereinabove, the connection members or connection assemblies employed for interengagement of the auger trough base pan with the cross-pieces and for securing the auger trough base pan in position during harvesting operations may take numerous forms, they should nevertheless function or operate, regardless of the particular form, to maintain the auger trough base pan in a relatively stable position relative to the cross-pieces during harvesting operations. While it is advantageous if the auger trough base pan and the cross-pieces are so complementarily engageable with one another that the fit or connection therebetween is substantial enough to obviate the need for further securing devices or constructions during harvesting operations, it may nevertheless be desirable to utilize additional or further locking or securing members or assemblies to ensure that the auger trough base pan remains secured in place in a harvesting use position.

In such regard, in one particular configuration, the connection assembly associated with the second end of the auger trough base pan may, in addition to the complementarily engageable components interengaging the second end of auger trough base pan and the clean grain auger trough, include a rest portion configured to rest upon a securing member or rod that is installable extending between the side-sheets. With such construction, when the first end of the auger trough base pan is engaged with the first cross-piece, the second end of the auger trough may be moved into mating engagement with the second cross-piece, such as by upward rotation of the second end of the auger trough base pan about the first end of the auger trough base pan, and the securing rod may them be installed to secure the auger trough base pan in such engaged position for use during harvesting.

For clean-out, the securing rod may be removed and the second end of the auger trough base pan may be disengaged from the second cross-piece, such as by the downward rotation of the second end of the auger trough base pan about the first end of the auger trough base pan. With the auger trough base pan in a tilted position, with the first end thereof remaining at least loosely engaged with the first cross-piece and the second end of the auger trough base pan resting upon or being in closer position to the ground, a user can relatively easily access the collecting troughs formed in the auger trough base pan for cleaning while the base pan remains in such in-place clean-out position. Especially if the remnants remaining in the collecting troughs are loose, as opposed to encrusted, remnants, the tilting of the base pan may be sufficient to effect the discharge of the loose remnants from the then-depending second end of the base pan, and little additional cleaning may be necessary prior to re-engagement of the second end of the base pan with the second cross-piece.

If more thorough clean out of the auger troughs is considered desirable or required, such as might be the case if the collecting troughs have become obstructed or clogged by encrusted remnants in the collecting troughs, the first end of the auger trough can also be easily disengaged from the first cross-piece and the auger trough base pan can be entirely removed, such as to permit cleaning of the base pan and its collecting troughs at a different or remote location.

Once appropriate clean-out of the troughs of the auger trough base pan has been effected, either while the base pan is in its in-place clean-out position or after the totally removed base pan has been cleaned at some other desired location, the auger trough base pan can thereafter be quickly and easily re-positioned for re-installation and re-installed for further use.

With such a construction, the collecting troughs can be much more conveniently accessed than was previously the case, and clean out of the collecting troughs can be quickly and easily effected, without any extensive disassembly of the collecting and conveying systems or the need for any specialized tools, and without the accompanying time loss that resulted from such activities.

DETAILED DESCRIPTION OF THE INVENTION

Figure 1:
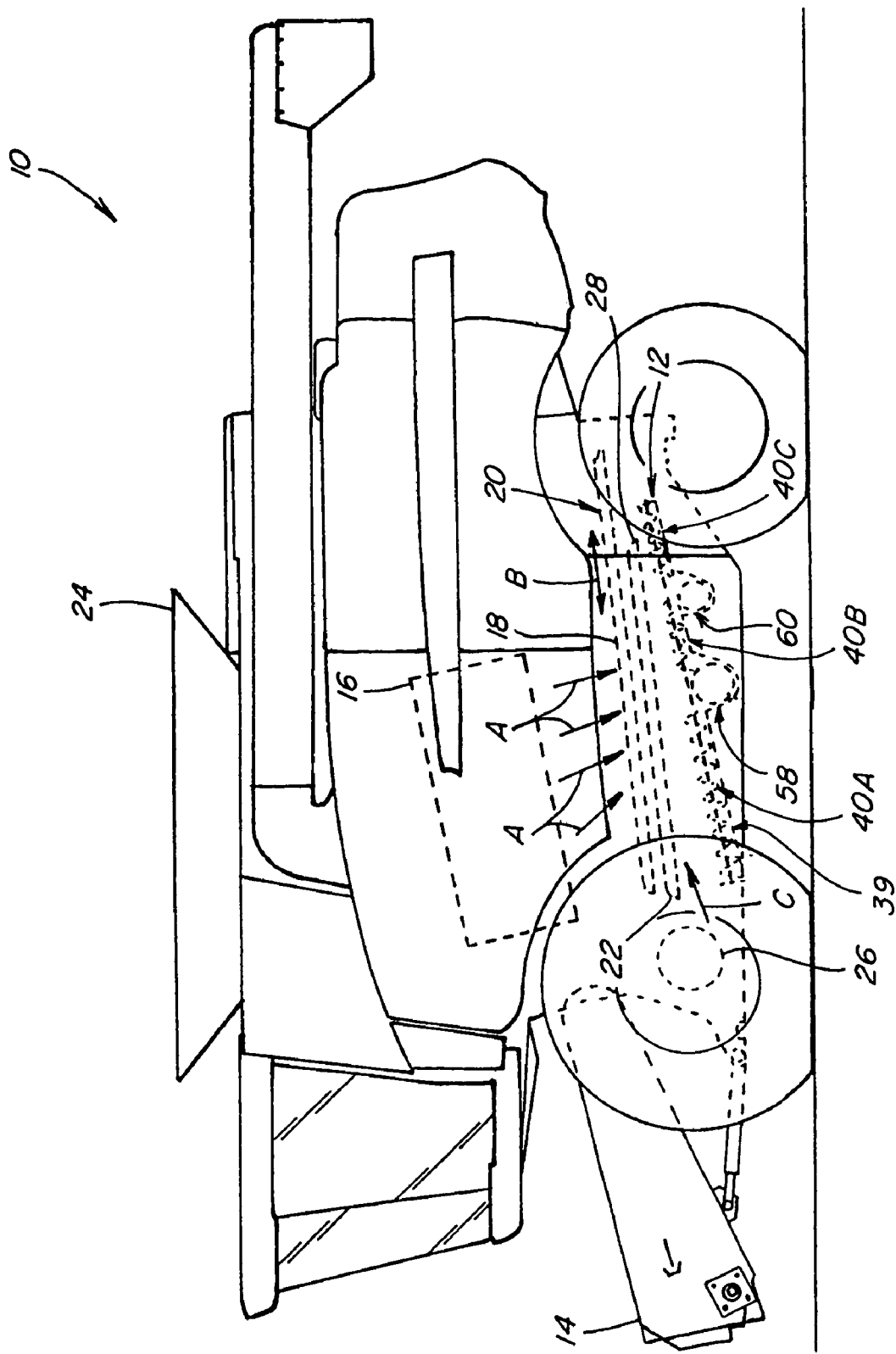
FIG. 1 is a simplified side view of an agricultural combine including one form of a clean grain and tailings collecting and conveying system, wherein the tailings pain is effectively joined to the clean grain pan to be a rearward extension thereof, with the collecting troughs that feed to the clean grain and tailings auger troughs generally residing in the same inclined plane, and wherein the clean grain and tailings collecting and conveying system employs an auger trough base pan according to the present invention.
Figure 2:
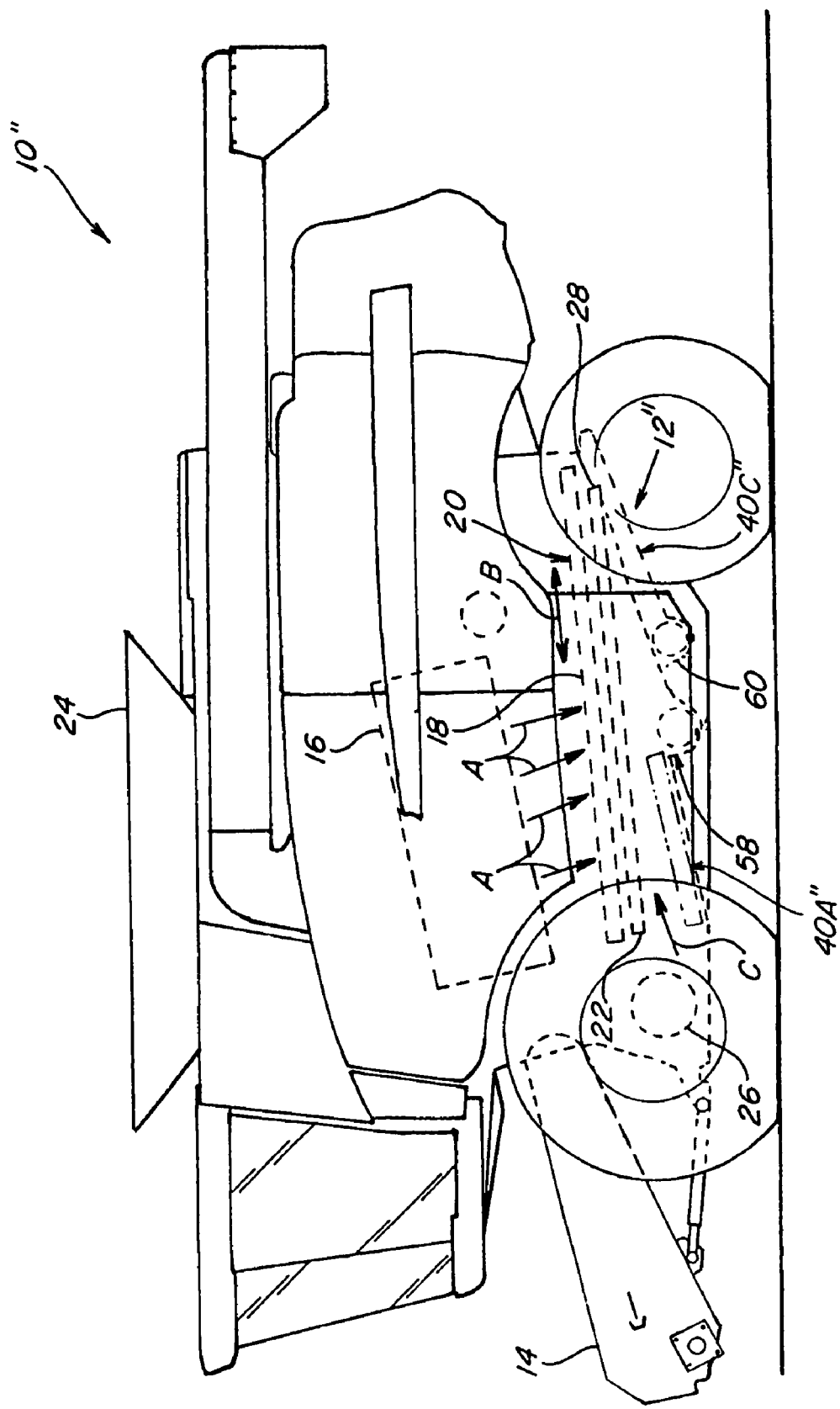
FIG. 2 is a simplified side view of an agricultural combine including a somewhat different form of clean grain and tailings collecting and conveying system, wherein the tailings pan and the clean grain pan are separate pans, with the collecting troughs that feed to the clean grain and tailings auger troughs residing in different inclined planes, and wherein the clean grain and tailings collecting and conveying system employs an auger trough base pan according to the present invention.

Referring now to the drawings, wherein like numbers refer to generally like items or features, FIGS. 1 and 2 depict generally similar agricultural combines 10 and 10" that include similar, but somewhat different, respective clean grain and tailings collecting and conveying systems 12 and 12", each of which systems 12 and 12" include auger trough base pan constructions according to the present invention.

Combines 10 and 10" are of conventional, well known construction, each including a feeder house 14 on a front end thereof, to which is connectable a header (not shown) operable to sever a swath of crops from a field as the combine is moved forwardly thereover and to convey the severed crops to feeder house 14. Feeder house 14 includes an internal conveying system (not shown) for conveying the crops upwardly and rearwardly into the bodies of the combines 10 and 10", into an inlet of a separating or threshing system 16 of the combines. Threshing system 16 generally includes a rotary rotor at least partially enclosed in a concave defining an arcuate space therebetween, and in which space the crop material is processed, for separating grain, and material other than grain (MOG), from straw, with the straw being ejected rearwardly from the threshing system through the rear end of the combine for deposit on the field, in the well known manner.

As threshing system 16 operates, crop material will fall, and/or be conveyed, therefrom, as denoted generally by arrows A, onto an upper sieve 18 of a cleaning system 20 located below threshing system 16 within the body of combines 10 and 10". Such cleaning system 20 also includes a lower sieve 22 positioned below upper sieve 18 in a stacked relationship therewith, and the sieves 18 and 22 are configured to be reciprocally moved or vibrated relative to one another to effect a sifting of material falling onto the upper sieve 18.

As the crop material from the threshing system 16 falls onto upper sieve 18, air from a fan 26 is blown upwardly and rearwardly through sieves 18 and 22. The combination of this air flow and the vibratory movement of the sieves 18 and 22 causes the lighter elements of the MOG, referred to also as chaff, to be blown upwardly and rearwardly away from sieves 18 and 22. Such chaff is typically blown into an optional chaff spreader (not shown), operable for distributing the chaff over a desired swath of the field from which the crop is cut, or directed into an optional chopper (also not shown), operable for mixing the chaff with straw for chopping and distributing such mix, or simply directed downwardly onto the field through a rear opening of the combine, all of which operations can be effected in well known manners.

Upper sieve 18 includes openings therethrough that are sized to allow separated grain as well as some smaller elements of MOG, sometimes referred to as tailings, to pass therethrough and to fall onto lower sieve 22 of the cleaning system 20, thus sifting the separated grain and tailings from larger elements of MOG. The larger elements of MOG that are unable to pass through upper sieve 18 are moved to the rear peripheral edge portion of such sieve by the vibratory movements of such sieve to fall thereover, either directly onto the underlying field or onto or into other apparatus for further processing, including chopping and/or spreading. Such further processing of such larger elements of MOG may be accomplished in various well known manners by well known equipment (not shown).

Lower sieve 22 has smaller openings therethrough than upper sieve 18, such that the sieves 18 and 22 will act as a progressive sifting or cleaning mechanism for separating and cleaning grain from the tailings that were also able to pass through sieve 18. To facilitate such sifting action and the flow of grain through the stacked sieves 18 and 22, such sieves are vibrated or reciprocally moved, typically in a fore and aft direction, as denoted by arrow B. The grain that falls through lower sieve 22 into clean grain and tailings systems 12 and 12" of combines 10 and 10" is considered to be clean grain that is desired to be collected and ultimately conveyed to a grain tank 24.

The tailings that are allowed to pass through the upper sieve 18 often may still contain some unseparated grain, and retention of such tailings for further processing thereof to effect separation of the grain therefrom is generally desired. Such tailings, which are unable to pass through the smaller openings on lower sieve 22, are caused to move towards a rear peripheral edge portion 28 of sieve 22, and to fall thereover, by the vibratory movement of lower sieve 22, into clean grain and tailings collecting and conveying systems 12 and 12" of combines 10 and 10" for further processing.

Figure 3:
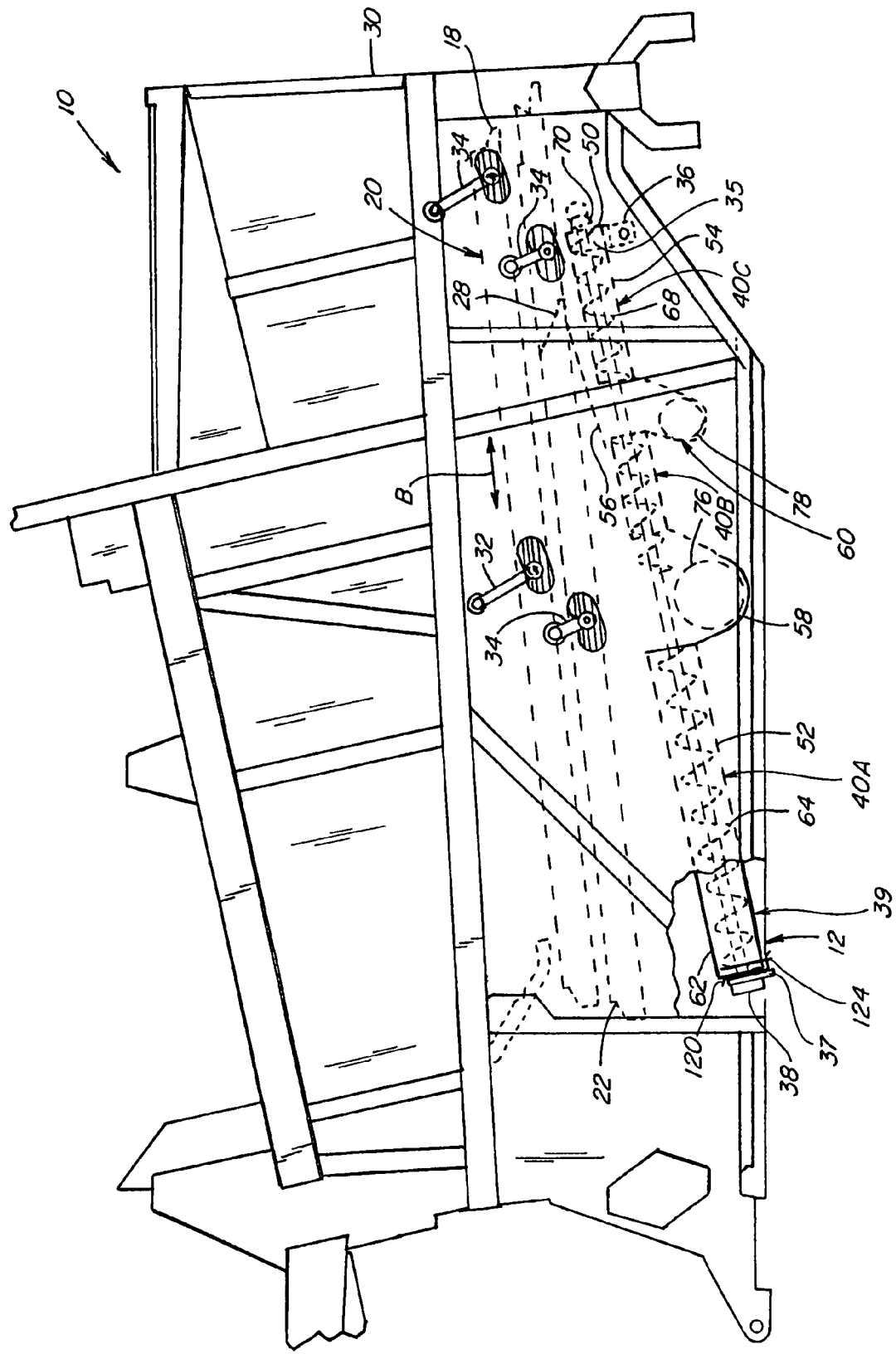
FIG. 3 is a simplified side view of a structural frame of the combine of FIG. 1, depicting in greater detail the clean grain and tailings collecting and conveying system of such combine and the mounting thereof in connection with the frame.
Figure 4:
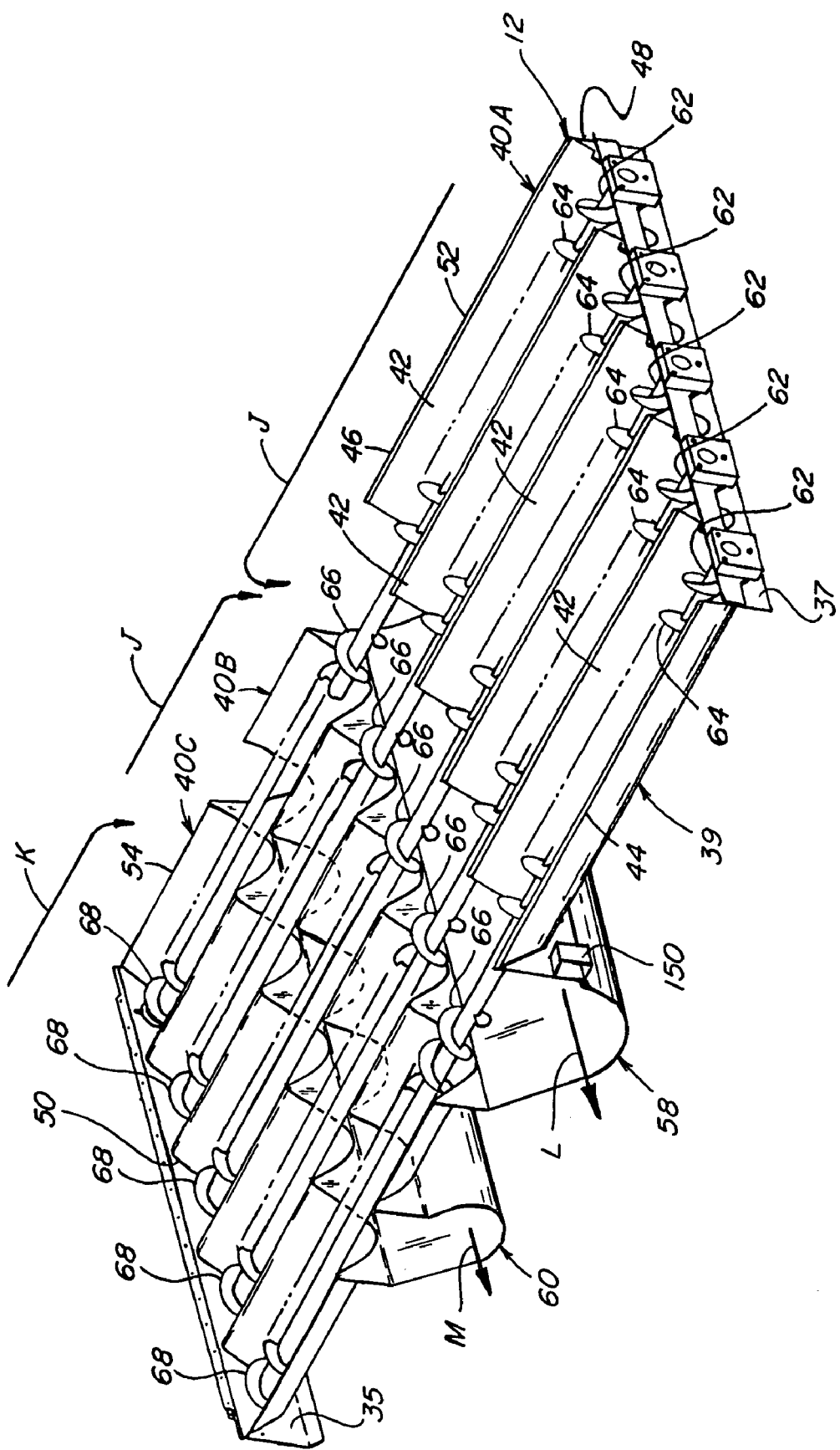
FIG. 4 is a partial perspective view of the clean grain and tailings collecting and conveying system of FIG. 1, depicting in greater detail the positioning of the collecting troughs and the clean grain auger trough and tailings auger trough relative to one another.
Figure 5:
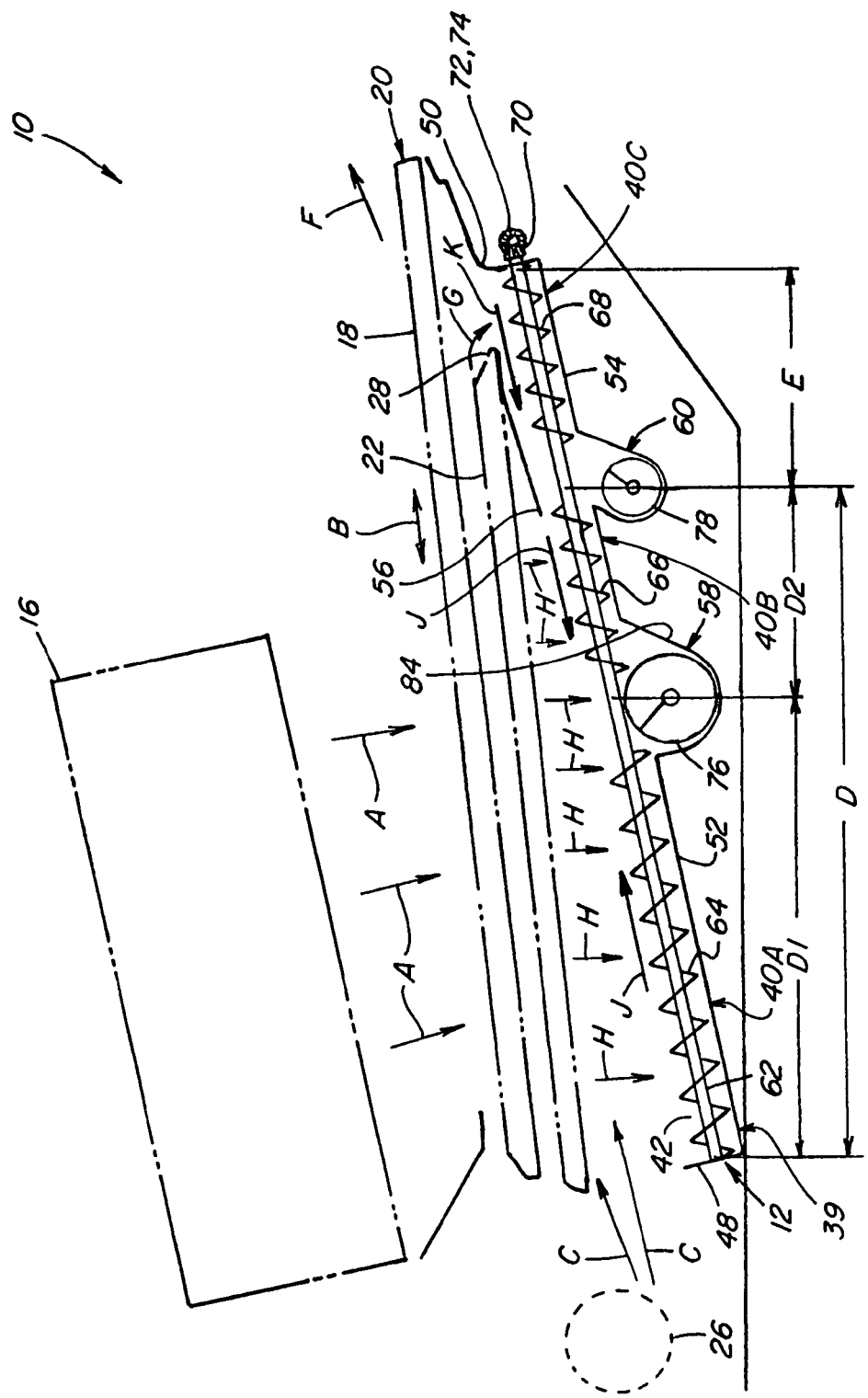
FIG. 5 is a simplified side view of elements of the collecting and conveying systems of FIGS. 1 and 3-4.
Figure 6:
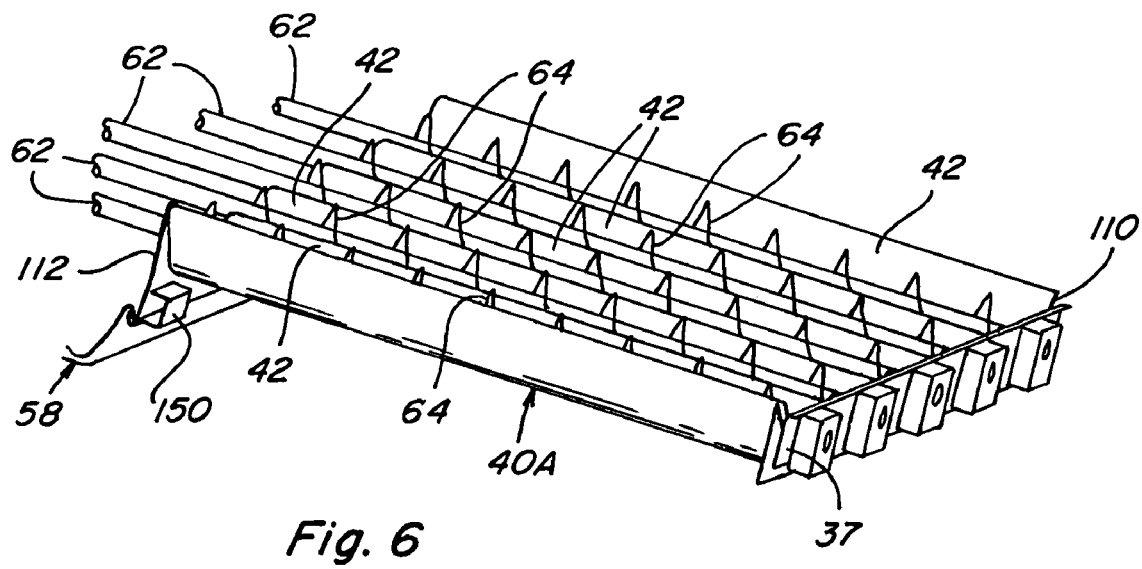
FIG. 6 is a perspective view more particularly depicting an auger trough base pan according to the present invention, particularly as such auger trough base pan might be employed with the clean grain and tailings collecting and conveying system of FIG. 1.

FIGS. 3-5 depict in greater detail certain elements of the cleaning system 20 as well as further details of the clean grain and tailings collecting and conveying system 12 of FIG. 1. In such regard, FIG. 3 illustrates the manner in which sieves 18 and 22 may be suspended from a structural frame 30 of combine 10 by pivoting support arms 32 and 34, respectively, for reciprocal fore and aft movement. Such movement, as denoted by arrow B, may be readily effected by various suitable and well known drive mechanisms (not shown) that operate in well known manners. Clean grain and tailings collecting and conveying system 12 is depicted as being connected or mounted below lower sieve 22 of cleaning system 20 to structural frame 30 by brackets 36 and 38, so as to be maintained generally fixed to structural frame 30 during harvesting operations.

FIGS. 3-5 also illustrate the construction and operation of the clean grain and tailings collecting and conveying system 12 of FIG. 1. Such collecting and conveying system 12 generally includes a collection base construction 39 that includes a rear cross-piece 35 mounted to structural frame 30, such as by brackets 36, a front cross-piece 37 also mounted to frame 30, such as by brackets 38, and pan portions 40A, 40B, and 40C extending, respectively, between front cross-piece 37 and a crossways extending clean grain auger trough 58, between clean grain auger trough 58 and a crossways extending tailings auger trough 60, and between tailings auger trough 60 and the rear cross-piece 35. Such collection base construction 39 is positioned so as to be located directly beneath lower sieve 22 of cleaning system 20 and, for reasons that will become evident hereinafter, to extend beneath and beyond peripheral edge portion 28 of lower sieve 22 (FIG. 3).

As best shown in FIG. 4, the pan portions 40A, 40B, and 40C of collection base construction 39 have upper sides that include a plurality or array of elongated, longitudinally extending collecting troughs 42 formed therein and positioned side-by-side to another across the width of such pan portions 40A, 40B, and 40C. Such collecting troughs 42 preferably extend in the fore and aft direction, between a forward edge 48 of collection base construction 39 at front cross-piece 37 and a rear edge 50 at rear cross-piece 35. Each such collecting trough 42 has a clean grain receiving portion 52, located beneath those regions of lower sieve 22 through which clean grain is expected to fall, and a tailings receiving portion 54, positioned extending directly beneath peripheral edge portion 28 of lower sieve 22 (FIG. 3).

As may be better observed from FIG. 5, clean grain receiving portion 52, associated with pan portions 40A and 40B, has an overall fore and aft extent D, as denoted by arrow D, and tailings receiving portion 54, associated with pan portion 40C, has an overall fore and aft extent E, as denoted by arrow E. The extent of clean grain receiving portion 52 is further subdivided into a forward clean grain receiving region, associated with pan portion 40A, generally having a fore and aft extent denoted D1, and a rear clean grain receiving region, associated with pan portion 40B, having an extent D2.

The portion D of the collection base construction 39 that includes the clean grain receiving portions 52 of the collecting troughs 42 is sometimes considered to be or referred to as the clean grain pan and the portion E of the pan 40 that includes the tailings receiving portion 54 is sometimes considered to be or referred to as the tailings grain pan. The portions of the collecting troughs in the clean grain pan are then sometimes considered to be or referred to as clean grain collecting troughs while the portions of the collecting troughs in the tailings pan are then sometimes considered to be or referred to as tailings collector troughs.

Recapitulating, with particular reference to FIG. 5, as grain and MOG flows downwardly from threshing system 16 onto upper sieve 18 during a harvesting operation, with such flow being denoted generally by arrows A, upper sieve 18 and lower sieve 22 are reciprocally moved, as denoted by arrow B, for the purpose of sifting and cleaning grain from MOG. Simultaneously, fan 26 operates to generate upward and rearward air flows, denoted by arrows C, which blow through the openings through sieves 18 and 22 to carry chaff rearwardly, away from cleaning system 20, as denoted by arrow F.

As such actions occur, tailings are allowed to pass through the openings of upper sieve 18, but not those of lower sieve 22. The tailings are moved by vibration rearwardly along the surface of lower sieve 22, until they reach peripheral edge portion 28, which is the rear edge of lower sieve 22, where such tailings fall therefrom, as denoted by arrow G. Those tailings fall onto tailings receiving portion 54 of pan portion 40C, which is located directly below edge portion 28.

Meanwhile, clean grain is allowed to pass through lower sieve 22, as denoted by arrows H, so as to fall onto clean grain receiving portion 52 of collection base construction 39. Some of the clean grain will typically fall onto clean grain receiving portion 52 in the forward region D1, such as into pan portion 40A, and some will fall in the rear region D2, such as into pan portion 40B. A deflector shield 56 is preferably disposed beneath the rear end portion of lower sieve 22 to deflect clean grain which falls therethrough forwardly, so as to fall onto clean grain receiving portion 52 of collection base construction 39, as opposed to tailings receiving portion 54 located below the rear end.

Clean grain auger trough 58 is disposed generally crosswise to and in communication with the clean grain collecting troughs of clean grain receiving portion 52 such that clean grain can be conveyed through the clean grain collecting troughs to the clean grain auger trough, and tailings auger trough 60 is disposed generally cross-wise to and in communication with the tailings collector troughs of tailings receiving portion 54. An elongated, helical auger 62 is supported in each collecting trough 42, so as to extend longitudinally in the fore and aft directions therealong, continuously through both the clean grain receiving portion 52 and the tailings receiving portion 54. Each auger 62 includes a first helical auger flight 64 extending in a first predetermined direction therearound through the forward clean grain receiving portion D1 of pan 42 and a second helical auger flight 66 extending in a second rotational direction therearound, opposite the first rotational direction, through the region D2 and through the tailings receiving portion 54. Each auger 62 is connected to a drive mechanism operable for rotating it, here the mechanism being illustrated as including a bevel gear 70 on the rear end of auger 62, which gear is enmeshed with a bevel gear 72 on a drive shaft 74 which extends sidewardly across the rear end of collection base construction 39, so as to jointly rotate augers 62. Drive shaft 74 can be rotated by any suitable drive, such as, but not limited to, a belt, chain or shaft, in connection with a power plant of combine 10 (not shown).

When augers 62 are rotated in a predetermined rotational direction, flights 64, 66, and 68 will convey clean grain and tailings separately and simultaneously along collecting troughs 42, with clean grain from the clean grain collecting troughs being moved into clean grain auger trough 58 and tailings from the tailings collector troughs being moved into tailings auger trough 60, as denoted by respective arrows J and K. Clean grain auger trough 58 preferably has a helical auger 76 associated therewith and tailings auger trough 60 preferably has a similar auger 78 associated therewith, which augers are rotatable in the conventional manner using suitable drives (not shown) for conveying the clean grain and tailings, respectively, to a clean grain elevator (not shown) and a tailings return system (also not shown), in well known manners, as denoted by arrows L and M in FIG. 4.

In accordance with the present invention, one or more of the pan portions 40A, 40B, and 40C of the collecting and conveying system 12 of FIG. 1 may be designed and formed as a separable base pan unit that is sized to extend longitudinally between first and second cross-pieces and laterally between sidesheets 100 and 102 (FIG. 12) of the combine 10. As better shown in FIGS. 6-11, in one preferred embodiment pan portion 40A is a separable base pan sized to extend longitudinally between front cross-piece 37 and clean grain auger trough 58 and formed to include a plurality of longitudinally extending collecting troughs 42 on its upper side, with augers 62 passing through the collecting troughs 42 to move the clean grain falling into such collecting troughs 42 to the clean grain auger trough 58. When installed for use during a harvesting operation, first end 110 of base pan 40A is complementarily engaged with a first cross-piece, in this instance, front cross-piece 37, and second end 112 of base pan 40A is complementarily engaged with clean grain auger trough 58, with base pan 40A held maintained or secured in such engagement.

Figure 7:
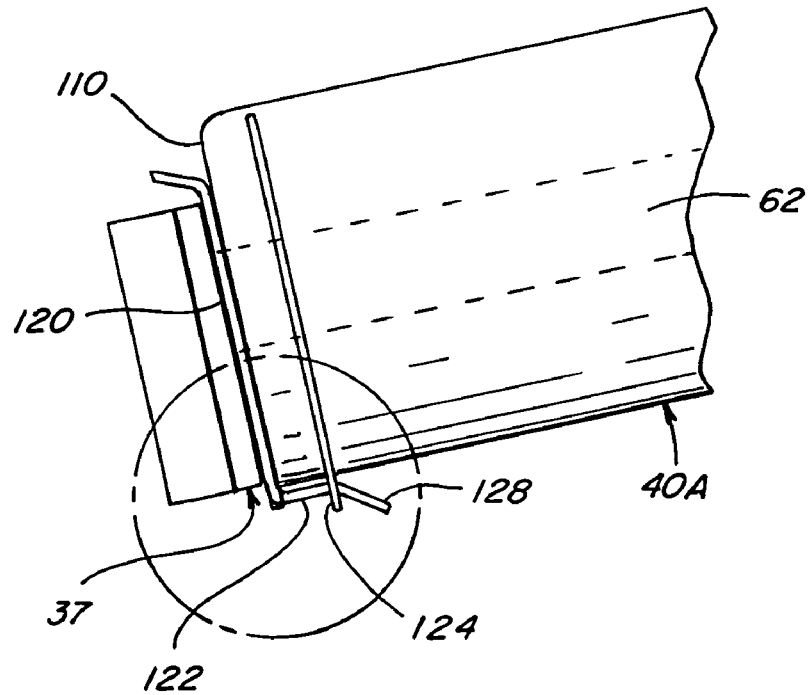
FIG. 7 is a side view depicting in greater detail the first end of the auger trough base pan of FIG. 6 complementarily engaged with a first cross-piece.
Figure 8:
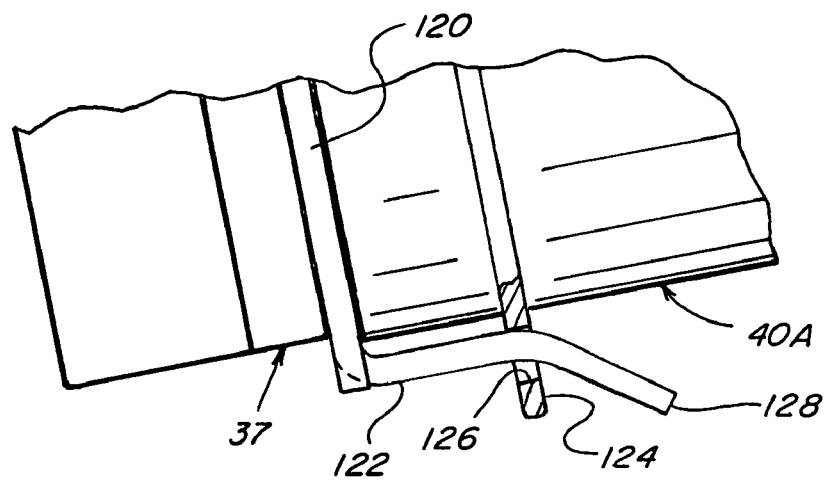
FIG. 8 is a breakout view of a portion of the construction of FIG. 7, as included in the circled portion of FIG. 7, showing in further detail the tab and slot interengagement of the first end of the auger trough base pan with the first cross-piece.

As better shown in FIGS. 7 and 8, first end 110 of base pan 40A and cross-piece 37 preferably include members complementarily engageable with one another to position first end 110 proximate to cross-piece 37. Although various and sundry engagement or mating members may be employed to effect such complementary engagement, one interengageable connection or mating assemblage that has been found suitable for the intended purpose employs a bracket member 120 mounted to front cross-piece 37, which bracket member 120 has a projecting tab 122 near the lower end thereof extending therefrom, and an exterior flange 124 near first end 110 of base pan 40A that includes a slot 126 therethrough sized to receive and accommodate projecting tab 122 as first end 110 of base pan 40A is moved towards cross-piece 37 with slot 126 (FIG. 8) aligned with projecting tab 122. The projecting tab 122 preferably has a downward bend near its distal end 128, the purpose of which will become further apparent from that which follows. Although the bracket member 120 is here shown as an element separate from and mounted to front cross-piece 37, front cross-piece 37 may itself form or include the bracket component, with the projecting tab 122 formed or included therewith near the lower end thereof.

Figure 9:
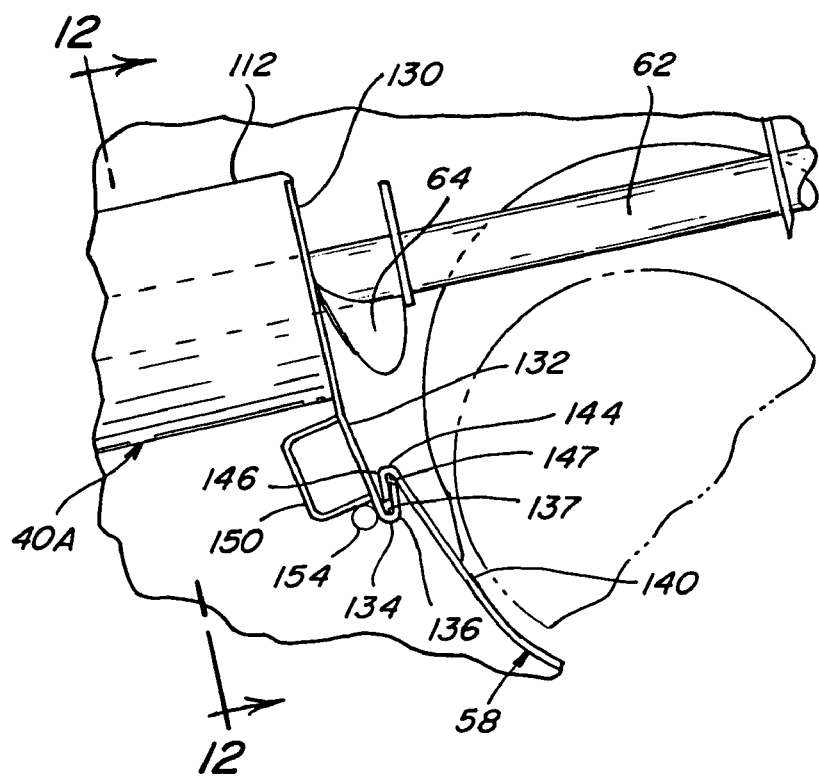
FIG. 9 is a side view depicting in greater detail the second end of the auger trough base pan of FIG. 6 complementarily engaged with the clean grain auger trough.

As better shown in FIG. 9, second end 112 of base pan 40A and clean grain auger trough 58 are also designed to be complementarily engageable with one another. Although various and sundry engagement or mating members may similarly be employed to effect such complementary engagement, one interengageable connection or mating assembly that has been found suitable for the intended purpose employs an end cap portion 130 at the second end 112 of base pan 40A, the upper end of which end cap portion is scalloped at the intersection thereof with the ends of the collecting troughs formed in or on the upper side of the base pan 40A in order to leave such ends of the collecting troughs open for communication with the clean grain auger trough 58, as shown in FIG. 4. Such end cap portion 130 has a depending extension 132 that projects downwardly to a laterally extending fold 134 that forms an outward and upward lip curl 136, with an associated upwardly directed lip curl channel 137, and a laterally extending fold 144 along side 140 of clean grain auger trough 58 that forms an outward and downward lip curl 146 along side 140, with an associated downwardly directed lip curl channel 147.

When base pan 40A is installed for use during harvesting operations, lip curls 136 and 146 may be complementarily engaged with one another as shown in FIG. 9, with the distal ends of the lip curls disposed in the opposed lip curl channels, such that a relatively smooth and uniform passageway is maintained through clean grain auger trough 58. Preferably, the materials utilized in forming such lip curls 136 and 146, and the interengagement fit therebetween, will be such that, when the lip curls are fully engaged with one another, a tight fit is formed and interengagement therebetween can be maintained without the necessity for further support or securing members or assemblies, although such need not necessarily be the case, especially if other or additional members are employed or utilized to ensure that base pan 40A remains maintained or secured in place during harvesting operations.

The depending extension 132 of end cap portion 130 additionally preferably includes one or more positioning assistance members along the lateral expanse of such depending extension 132, which positioning assistance members are depicted in FIG. 9 as finger rings or handles 150 that may be grasped by a user as the user is positioning or moving the base pan 40A.

Figure 10:
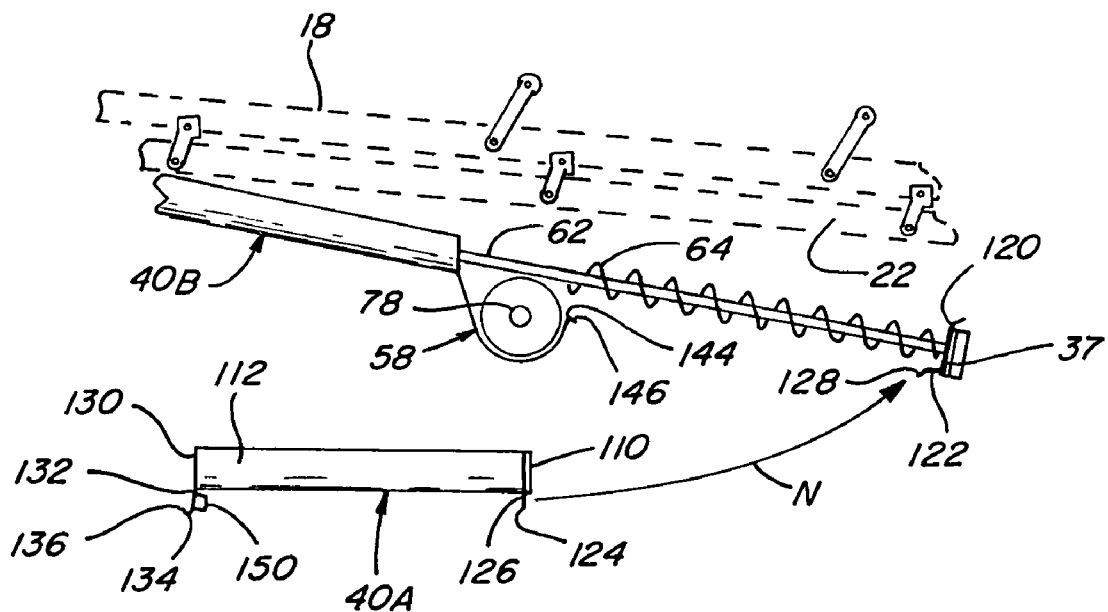
FIG. 10 is a side view generally depicting the manner in which the first end of the auger trough base pan may be engaged with the first cross-piece.
Figure 11:
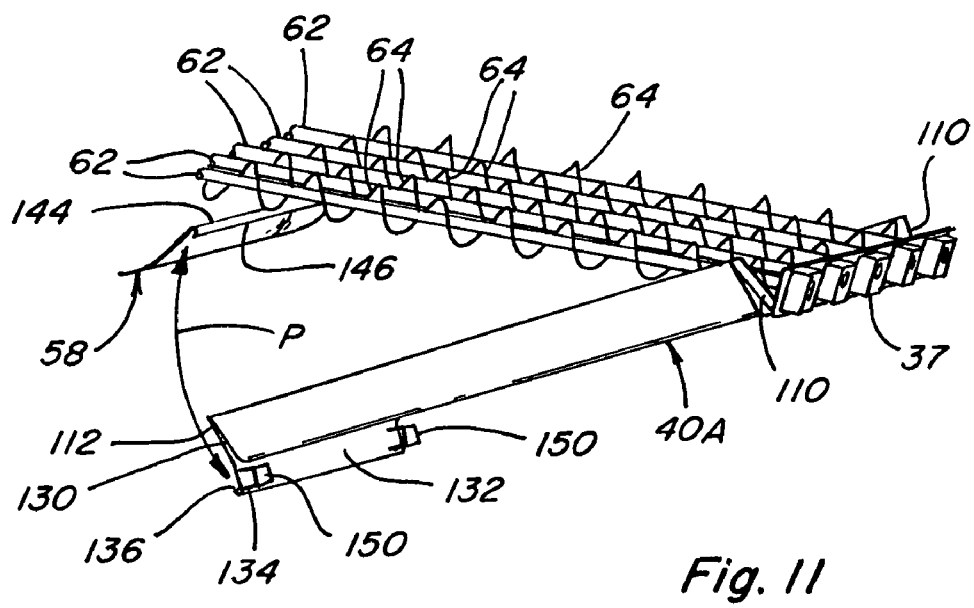
FIG. 11 is a perspective view somewhat similar to FIG. 6 depicting the auger trough base pan in an inclined position with its first end loosely engaged with the first cross-piece, such as it might be deployed for cleaning in an in-place clean-out position, and indicating the manner in which the second end of the auger trough base pan would be moved to effect complementary engagement of the second end of the auger trough base pan with the clean grain auger trough.

As is shown in FIG. 10, when the base pan 40A is to be installed for use during harvesting operations, slot 126 of the exterior flange 124 near first end 110 of base pan 40A is aligned with the downward bent distal end 128 of projecting tab 122 of bracket member 120 associated with cross-piece 37, and first end 110 of base pan 40A is then moved towards cross-piece 37, as denoted by arrow N, to effect the insertion of projecting tab 122 through slot 126 and placement of first end 110 proximate to cross-piece 37. When such action is effected, the base pan 40A is typically then in a position such as is generally shown in FIG. 11.

By then grasping the handles 150 and moving second end 112 of base pan 40A upwardly, as denoted by arrow P, a user can move the lip curls 136 and 146 associated, respectively, with the second end 112 of base pan 40A and with clean grain auger trough 58 into complementary engagement with one another, such as is shown in FIG. 9. As is further shown in FIG. 9, and as will be further addressed hereinafter, such handles 150 may also be configured and positioned to act as part of a construction or assemblage for securing and maintaining the base pan 40A in engagement with front cross-piece 37 and clean grain auger trough 58 during harvesting operations. In such regard, the handles 150 may be configured to rest upon a rod 154 or other support member or support apparatus that may be easily installed to secure the base pan 40A in a harvesting use position.

Figure 12:
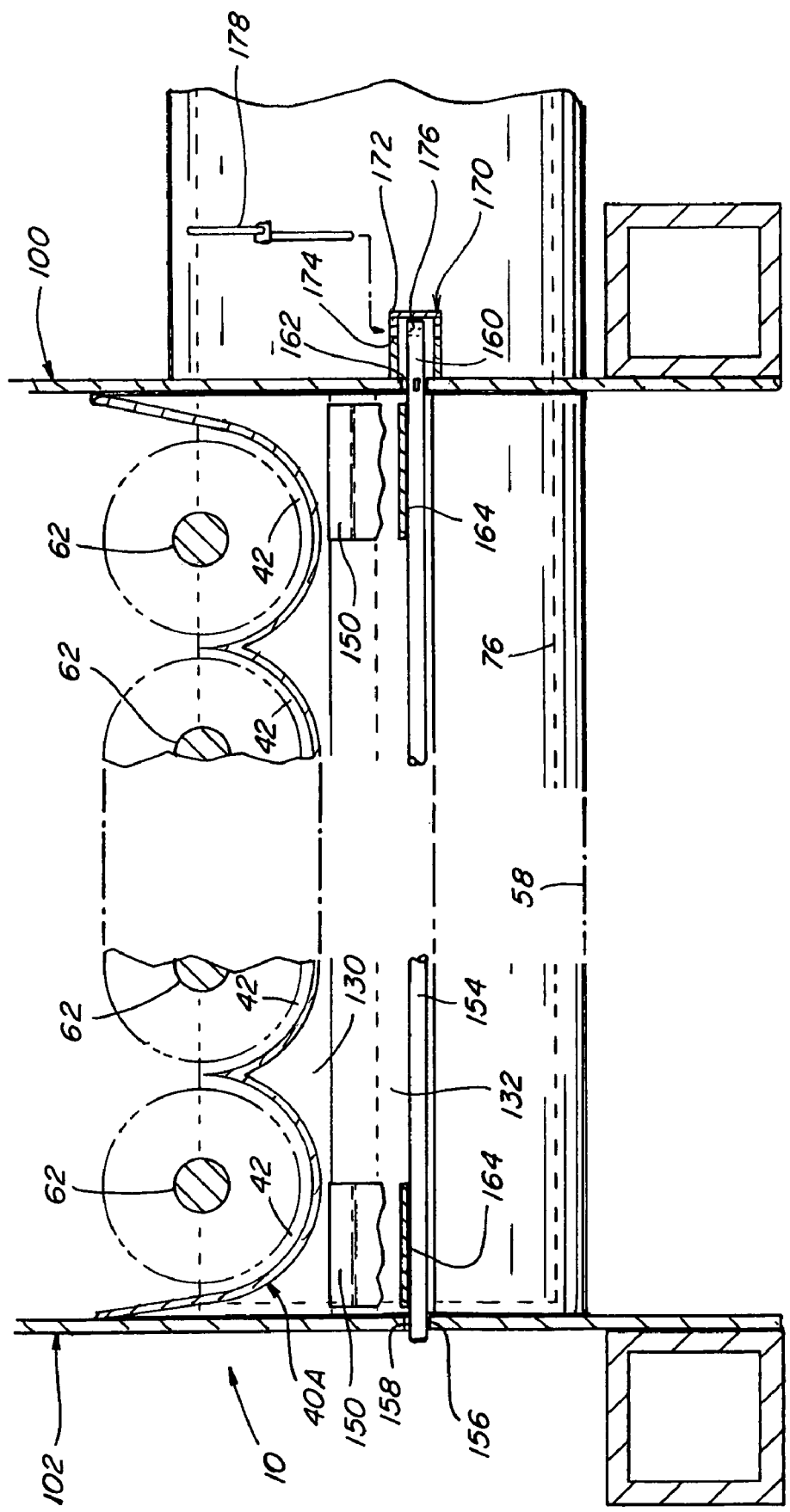
FIG. 12 is a view, taken generally along cut 12-12 of FIG. 9, looking towards the clean grain auger trough, across the width of an installed auger trough base pan, presented partly in section and partly in cut-away in order to more clearly present certain components relative to the subsequent discussion, depicting the second end connection pairing provided for maintaining the second end of the auger trough base pan in complementary engagement with the clean grain auger trough and the auger trough base pan in a relatively stable position during harvesting operations.

In the particular embodiment of FIG. 9, in order to ensure that base pan 40A is securely maintained in such a harvesting use position during harvesting operations, rod 154 is employed to lock or maintain the base pan 40A in such desired position. FIG. 12 depicts from a different vantage point the use of rod 154, which is one of many possible constructions or configurations that could be employed for such purpose. In accordance with the depicted embodiment, one end 156 of rod 154, which has a length slightly longer than the width between the sidesheets 100 and 102, can be inserted into and extended through a hole or opening 158 in sidesheet 102 sufficiently far enough to permit the other end 160 of rod 154 to be moved to be closely adjacently aligned with a similar, opposite hole or opening 162 in sidesheet 100, with the bottoms 164 of handles 150 on the depending extension 132 of end cap portion 130 at second end 112 of base pan 40A resting upon rod 154. Such other end 160 of rod 154 can then be inserted into and extended through opening 162 in sidesheet 100 such that rod 154 extends between and is supported by sidesheets 100 and 102 and in turn supports second end 112 of base pan 40A in the manner as shown in FIG. 12.

A support locking mechanism 170 can preferably also be employed to ensure that the rod 154 remains in place supporting base pan 40A during harvesting operations. In the embodiment of FIG. 12, the support locking mechanism 170 includes a rod stop enclosure 172 on the outer side of sidesheet 100 about hole 162 to limit the amount by which the other end 160 of support rod 154 may project through such hole 162, as well as alignable holes 174 and 176 in, respectively, the rod stop enclosure 172 and the rod 154, and a locking pin, such as a cotter or latching pin, including linchpin 178 depicted in FIG. 12, insertable through such holes 174 and 176 to lock the rod 174 in position supporting second end 112 of base pan 40A.

It should be understood that the particular embodiment depicted in FIG. 12 is but one of many possible securing constructions or configurations that can be employed to ensure that the base pan 40A is maintained in a harvesting use position during harvesting operations and that numerous other constructions or configurations could be equally as well employed to ensure the maintenance of such base pan 40A in such position, including constructions and configurations that generally secure the base pan 40A in place relative to one or both of the sidesheets 100 and/or to the clean grain auger trough 58, which itself may be installed in a generally fixed position relative to the sidesheets 100 and 102, during harvesting operations.

As has already been discussed hereinabove, and as is reiterated here, it should be understood that the connection members and connection assemblies presented herein, including the particular complementary engagement constructions and configurations discussed hereinabove, are but examples of many possible constructions and configurations that could be employed for like purposes and that the descriptions and discussions of the noted constructions and configurations are not intended to be limit the possible constructions or configurations that could be employed so long as such constructions and configurations otherwise achieve the results sought therefor.

With reference to the particular embodiments and constructions depicted in FIGS. 6-12, when a user desires to clean out the collecting troughs of base pan 40A, it is a simple matter for such user to remove the linchpin 178, to withdraw end 160 of rod 154 from rod stop enclosure 178 and through hole 162 in sidesheet 100, and to then remove end 156 of rod 154 from hole 158 of sidesheet 102. In the absence of the locking or securing support provided by rod 154, second end 112 of base pan 40A can thereafter be rotated downwardly by a user, such as by grasping and utilizing handles 150 to pull lip curls 134 and 144 apart, about the still, at least loosely, engaged first end 110 of base pan 40A to position base pan 40A in a tilted position, such as with second end 112 resting upon or near a ground surface and with first end 110 remaining raised and proximate to first cross-piece 37, to a position such as is shown in FIG. 11, which position is sometimes referred to herein as the in-place clean-out position. When the auger trough base pan 40A is positioned in such in-place clean-out position, the collecting troughs 42 in base pan 40A can be relatively easily accessed by a user for cleaning.

If desired, or if more thorough cleaning of the collecting troughs 42 is considered warranted, the auger trough base pan 40A can also be totally removed by disengaging first end 110 of base pan 40A from cross-piece 37 by moving base pan 40A such that slot 126 is drawn clear of projecting tab 122 of bracket member 120 on first cross-piece 37. With the base pan 40A thus disengaged from both cross-piece 37 and clean grain auger trough 58, such base pan 40A can be removed to a more desirable location for clean out.

When appropriate cleaning of the collecting troughs 42 of base pan 40A has been effected, base pan 40A can be easily re-installed for further use during harvesting operations in accordance with the procedures previously described and discussed hereinabove.

From the foregoing it should now be readily understood by those skilled that the base pan 40A described and discussed hereinabove can be advantageously employed with collecting and conveying systems such as shown in FIG. 1. It should be further apparent, however, that with systems such as those shown in FIG. 1, the base pan portions 40B and 40C could be similarly formed and designed to be complementarily engageable with the clean grain auger trough 58, the tailings auger trough 60, and cross-piece 35 such that pan portions 40B and 40C could similarly be adapted to be made more readily accessible for cleaning of the collecting troughs formed on the upper sides of such pan portions.

Particularly in such regard, it should be appreciated that the specific connection members and connection assemblies discussed hereinbefore are but examples of many, various complementary engagement and mating mechanisms or devices that could be employed in or with engagement pairings to position and maintain the removable pan portions in place for use during harvesting operations. Other mechanisms and devices, including guide members and connectors for maintaining the pan portions in engagement with the cross-pieces, including the clean grain auger trough and tailings auger trough, could be readily employed to much the same effect.

In light of the foregoing, it should be further appreciated that the particular forms of the interengageable engagement and mating features and mechanisms and components forming parts of the engagement or connection pairings are not considered to be necessarily critical to the present invention, but it should also be understood that certain particular features and mechanisms and components may afford greater or lesser advantages in terms of their ease of use and that those particular features and mechanisms that would provide greater ease of use would typically be considered more preferable. By way of example, the particular embodiments discussed hereinabove offer an optional advantage over various other possible embodiments in that both installation and partial or total disengagement for cleaning purpose of the base pan 40A can be readily effected by a user by hand, without the use of any tools.

Although the foregoing discussion has addressed the use of removable base pans principally in or in conjunction with the collecting and conveying system 12 of FIG. 1, it should be understood and appreciated that removable base pans could also be utilized in or with other types or forms of collecting and conveying systems, including systems such as the collecting and conveying system 12″ that is generally depicted in FIG. 2. Like the collecting and conveying system 12 of FIG. 1, collecting and conveying system 12″ operates to convey the clean grain to a clean grain auger trough 58 and the tailings to a tailings auger trough 60, but utilizes a configuration wherein the clean grain pan and the tailings pan are separate pans that may include separate collecting troughs with augers extending therethrough for conveying the materials that fall into such pans from the cleaning system 20 to the clean grain auger trough 58 and the tailings auger trough 60. In FIG. 2 herewith, items or features having identification markings that include a double prime designation therewith, e.g., 12″, 40A″, and 40C″, serve a purpose highly similar to, if not essentially identical to, items or features that have the same numerical identification, but without the prime designation, e.g., 12, 40A, and 40C. From the foregoing descriptions and discussions, particularly in conjunction with the drawings, those skilled in the art should be able to readily determine and make such modifications or changes to the base pan 40A discussed hereinabove as may be considered appropriate or desirable to effect the use of such a base pan in or in conjunction with system 12″ or with other collecting and conveying systems.

Additionally, inasmuch as the use of collecting troughs is not limited to the particular collecting and conveying systems discussed hereinabove, but can extend to other types of collecting and conveying systems as well, it should be appreciated that the subject invention is likewise not limited to use in or with the particular clean grain and tailings collecting and conveying systems discussed hereinabove and can be generally and readily adapted to and practiced with collecting troughs in many different systems and for various applications, all within the intended scope of this invention.

In light of all the foregoing, it should thus be apparent to those skilled in the art that there has been shown and described a construction for facilitating the clean out of the collecting auger troughs of collecting and conveying systems of agricultural combines, including, more particularly, a collecting trough base pan for such systems that has collecting troughs formed on the upper side thereof and which can be easily and quickly installed for use during harvesting operations and conveniently accessed or removed at different times for cleaning. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A collecting trough construction, having easy accessibility for cleaning, for a material collecting and conveying system of an agricultural combine wherein such material collecting and conveying system includes at least first and second cross-pieces that extend laterally across the combine between opposed sidesheets on the underside of the agricultural combine, such cross-pieces and sidesheets defining a location for a plurality of material collecting troughs, said collecting trough construction comprising
   a base pan having first and second ends, a length generally corresponding to the distance between the cross-pieces, and upper and lower sides,
   said base pan configured to have a plurality of longitudinal side-by-side troughs formed in said upper side thereof,
   said first end of said base pan configured to be positionable proximate to and complementarily engageable with a first cross piece,
   said second end of said base pan configured to be positionable proximate to and complementarily engageable with a second cross piece,
   said base pan movable by a user to, first, position said first end of said base pan in at least loose complementary engagement with the first cross piece and, when said first end is at least loosely engaged with the first cross-piece, to, secondly, effect simultaneous complementary engagement of said second end of said base pan with the second cross-piece,
   said base pan when so simultaneously engaged with the first and second cross-pieces defining and providing the plurality of collecting trough between the cross-pieces, such position of said base pan defining a harvesting use position,
   said base pan, when in said harvesting use position at certain times, being so secured in position to permit the collection of material deposited into said collecting troughs formed in the upper side of said base pan during a harvesting operation,
   said second end of said base pan being disengageable by the user from the second cross-piece at other times to permit the second end of said base pan to be tilted downwardly from said first end while said first end remains at least loosely engaged with and proximate to said first cross-piece, such downwardly tilted position of said base pan defining a tilted in-place clean-out position, said in-place clean-out position permitting general in-place access to the collecting troughs formed in the upper side of said base pan by a user for the cleaning of such collecting troughs.

2. The collecting trough construction of claim 1 wherein, when said second end of said base pan has been disengaged from said second cross-piece, said first end of said base pan is disengageable by the user from the second cross-piece, said base pan, when disengaged from both the first and second cross-pieces, being removable to a different location for cleaning of said collecting troughs thereof.

3. The collecting trough construction of claim 2 wherein said base pan is re-installable by the user by
   repositioning said first end of said base pan proximate to and complementarily engaging said first end with the first cross piece,
   repositioning said second end of said base pan proximate to and complementarily engaging said second end with the second cross piece.

4. The collecting trough construction of claim 3 including a securing assembly for ensuring that, when said base pan is engaged with the first and second cross-pieces, said base pan remains secured in a stable position relative to the cross pieces and the sidesheets of the combine during harvesting operations.

5. The collecting trough construction of claim 1
   wherein said first end of said base pan includes first end connection features therewith that are complementarily engageable with first cross-piece connection features associated with the first cross piece, such first end connection features and first cross-piece connection features forming a first end connection pairing, and
   wherein said second end of said base pan includes second end connection features therewith that are complementarily engageable with second cross-piece connection features associated with the second cross piece, such second end connection features and second cross-piece connection features forming a second end connection pairing.

6. The collection trough construction of claim 5 wherein said first end connection pairing includes
   a flange near said first end of said base pan extending outwardly from said base pan and including a slot therethrough,
   a projecting tab associated with the first cross-piece projecting generally from a proximal end nearer the first cross-piece towards a distal end nearer the second cross-piece,
   said slot and such projecting tab being complementarily sized and dimensioned for such projecting tab to be insertable into and to be accommodated within said slot as such projecting tab is moved therethrough,
   said flange being so positioned near said first end of said base pan and such projecting tab being of such a length that the distal end of such projecting tab projects through said slot in said flange when said first end of said base pan is positioned closely proximate to the first cross-piece with said slot and such projecting tab interengaged.

7. The collection trough construction of claim 6
   wherein the projecting tab is bent downwardly at an intermediate point between its proximal and distal ends, and
   wherein said slot and the projecting tab are interengageable such that, when said slot and such projecting tab are at least partially interengaged and said second end of said base pan is disengaged from the second cross-piece, said first end of said base pan remains generally proximate to the first cross-piece while said base pan tilts downwardly from said first end of said base pan towards said second end of said base pan to expose said collecting troughs formed in the upper side of said base pan for access by a user.

8. The collecting trough construction of claim 5 wherein said second end connection pairing includes
an end cap portion having a first interengagement portion therewith,
a second interengagement portion associated with the second cross-piece,
the first and second interengageable portions matable with one another when said base pan is moved to position said second end of said base pan in the harvesting use position with said second end of said base pan in close proximity to the second cross-piece.

9. The collecting trough construction of claim 8 wherein said end cap portion includes a depending portion with a distal end portion folded laterally outwardly back on itself to define a laterally extending outward and upward lip curl with a laterally extending upwardly directed lip curl channel associated with said second end of said base pan,
the second cross-piece includes a side with a fold portion extending laterally therealong, the fold portion having a distal end folded outwardly and back towards the side of the second cross piece to define along such side of the second cross-piece a laterally extending outward and downward lip curl with a laterally extending downwardly directed lip curl channel associated with the second cross-piece,
the lip curls of said end cap portion and such second cross-piece are complementarily engageable with one another such that
the distal end of said lip curl of said end cap portion is disposed in the downwardly directed lip curl channel associated with the second cross-piece and
the distal end of the lip curl of the second cross-piece is disposed in the upwardly directed lip curl channel associated with the second end of said base pan.

10. The collecting trough construction of claim 9 wherein the lip curls and lip curl channels are configured to be engageable with one another in a press fit engagement.

11. The collecting trough construction of claim 10 wherein, when said first end of said base pan is engaged with the first cross-piece and the lip curls and lip curl channels associated with said second end of said base pan and the second cross-piece are engaged with one another in a press fit engagement, the complementary engagements are sufficient to maintain said base pan in said harvesting use position.

12. The collecting trough construction of claim 9 wherein said second end connection pairing includes a further securing assembly for ensuring that, when said base pan is engaged with the first and second cross-pieces, said base pan remains secured in a stable position relative to the cross pieces and the sidesheets of the combine during harvesting operations.

13. The collecting trough construction of claim 12 wherein said securing assembly includes a rod like member installable extending between and supportable by the sidesheets near said second end of said base pan when said base pan is engaged with the first and second cross-pieces to provide underlying support for said base pan.

14. The collecting trough construction of claim 13 wherein said end cap portion of said second end of said base pan includes a handle graspable by a user to assist the user in manipulating and positioning said base pan, said handle and said rod-like member coordinately positionable relative to one another when said base pan is in its harvesting use position such that said handle rests upon said rod-like member.

15. The collecting trough construction of claim 8 wherein the collecting and conveying system includes a clean grain auger trough,
the second cross-piece is such clean grain auger trough, and
said end cap portion has an upper end that is scalloped at its intersection with the ends of said collecting troughs formed in said upper side of said base pan so as to leave such ends of said collecting troughs open for communication with the clean grain auger trough when said second end of said base pan is closely proximate to and engaged with the clean grain auger trough.

16. The collecting trough construction of claim 1 wherein the collecting and conveying system includes a clean grain auger trough and one of the first and second cross-pieces is the clean grain auger trough.

17. The collecting trough construction of claim 16 wherein the collecting and conveying system also includes a tailings auger trough and the other of the first and second cross-pieces is the tailings auger trough.

18. The collecting trough construction of claim 1 wherein the collecting and conveying system includes a tailings auger trough and one of the first and second cross-pieces is the tailings auger trough.

19. A collecting trough construction for a material collecting and conveying system of an agricultural combine wherein such material collecting and conveying system includes at least first and second cross-pieces that extend laterally across the combine between opposed sidesheets on the underside of the agricultural combine, such cross-pieces and sidesheets defining a location for a plurality of material collecting troughs, which collecting trough construction is both, alternatively, partially detachable to present the collecting trough construction to a user in an in place clean out position for cleaning and wholly removable to permit said collecting trough construction to be cleaned at a remote location, said collecting trough construction comprising
a base pan and
connection assemblies for complementarily engaging said base pan with the first and second cross pieces and securing said base pan so engaged,
said base pan having first and second ends, a length generally corresponding to the distance between the cross-pieces, and upper and lower sides,
said base pan configured to have a plurality of longitudinal side-by-side troughs formed in said upper side thereof,
said connection assemblies including
a first connection pairing, having first end connection component features therewith that are complementarily engageable with first cross piece connection component features associated with the first cross piece, for complementarily engaging said base pan with the first cross-piece and
a second connection pairing, having second end connection component features therewith that are complementarily engageable with second cross piece connection component features associated with the second cross-piece, for complementarily engaging said base pan with the second cross-piece,
said base pan movable by a user to position said first end thereof proximate to the first cross piece with said component features of said first end connection pairing interengaged with one another,
said second end of said base pan thereafter movable by the user, while said component features of said first end connection pairing are interengaged, to position said second end thereof proximate to the second cross piece with said component features of said second end connection pairing interengaged with one another, said base pan, when positioned with said component features of said first and second connection pairings both so interengaged, defining and providing the plurality of collecting trough between the cross pieces, such position of said base pan defining a harvesting use position, said base pan, when in said harvesting use position at certain times, being so secured in position to permit the collection of material deposited into said collecting troughs formed in the upper side of said base pan during a harvesting operation, said component features of said second end connection pairing being disengageable from one another at other times, while said base pan is positioned in said harvesting use position, to permit the second end of said base pan to be moved away from the second cross piece and tilted downwardly from said first end of said base pan while said component features of said first end pairing remain at least loosely interengaged with one another, such downwardly tilted position of said base pan defining a tilted in-place clean-out position, said in-place clean-out position permitting general in-place access to said collecting troughs formed in said upper side of said base pan by a user for the cleaning of said collecting troughs, said component features of said first end connection pairing also being disengageable from one another, when said component features of said second end connection pairing are totally disengaged from one another, to permit total removal of said base pan for cleaning of said collecting troughs thereof at a remote location.

20. The collecting trough construction of claim 19 wherein said component features of said first and second end connection pairings are interengageable with and disengageable from one another by the user by hand without the use of tools.

21. The collecting trough construction of claim 19 wherein said connection assemblies additionally include a securing assembly for ensuring that, when said base pan is engaged with the first and second cross pieces, said base pan remains secured in a stable position relative to the cross pieces and the sidesheets of the combine during harvesting operations.

* * * * *